US007017966B2

(12) United States Patent
Clonan

(10) Patent No.: US 7,017,966 B2
(45) Date of Patent: Mar. 28, 2006

(54) COLLAPSIBLE SADDLE BOX

(75) Inventor: Richard S. Clonan, Cazenovia, NY (US)

(73) Assignee: Slide Systems, LLC, Canastota, NY (US)

( * ) Notice: Subject to any disclaimer, the term of this patent is extended or adjusted under 35 U.S.C. 154(b) by 5 days.

(21) Appl. No.: 10/821,318

(22) Filed: Apr. 9, 2004

(65) Prior Publication Data

US 2005/0225110 A1 Oct. 13, 2005

(51) Int. Cl.
*B60R 9/00* (2006.01)

(52) U.S. Cl. ...................................... 296/37.6; 224/404

(58) Field of Classification Search ............... 296/37.5, 296/37.6, 26.04, 26.05; 224/404, 542, 497–498, 224/314, 551; 220/8

See application file for complete search history.

(56) References Cited

U.S. PATENT DOCUMENTS

| | | | | |
|---|---|---|---|---|
| 4,288,011 | A | 9/1981 | Grossman | |
| 4,850,519 | A | 7/1989 | Farmer, Jr. | |
| 5,028,088 | A * | 7/1991 | Del Monico et al. | 296/26.04 |
| 5,186,510 | A | 2/1993 | Stapp | |
| 5,598,961 | A | 2/1997 | Sills | |
| 6,056,177 | A | 5/2000 | Schneider | |
| 6,116,673 | A | 9/2000 | Clonan | |
| 6,170,724 | B1 | 1/2001 | Carter et al. | |
| 6,401,995 | B1 | 6/2002 | Yuille et al. | |
| 6,467,830 | B1 * | 10/2002 | Cortright | 296/37.6 |
| 6,536,826 | B1 * | 3/2003 | Reed | 296/37.5 |

* cited by examiner

*Primary Examiner*—Stephen Gordon
(74) *Attorney, Agent, or Firm*—Wall Marjama & Bilinski LLP

(57) ABSTRACT

A collapsible saddle box storage container that is collapsible to meet parcel shipping service size requirements by telescoping one portion thereof into another for shipping convenience.

18 Claims, 2 Drawing Sheets

COLLAPSIBLE SADDLE BOX

FIELD OF THE INVENTION

This invention relates in general to storage containers for use in the bed of a pickup truck or other vehicle having an open load-carrying area defined between a pair of spaced sidewalls and, in particular, to such a storage container which is collapsible to facilitate shipment and is readily erectable upon arrival at the delivery site.

BACKGROUND OF THE INVENTION

The use of storage boxes carried by the sidewalls of a pickup truck is well known. Boxes of this type generally have a single or two-part lid which opens about a hinged axis extending substantially the length of the storage box enabling the lid to pivot upwardly for access to the box interior. These boxes, however, can be configured in various manners to suit the user's purposes such as by having interior shelves and/or cabinet-like doors which open outwardly to provide access to the storage box interior.

While certain of these saddle box storage containers are fixably mounted to a forward portion of the pickup truck bed adjacent to the truck cab, it has been found that the access to and, therefore, the usage of the saddle box is far more convenient when the saddle box can be moved from a forward position adjacent to the truck cab to the rear most portion of the pickup truck bed adjacent to the tailgate. To this end the inventor of this invention has patented a mounting fixture for a truck bed, U.S. Pat. No. 6,116,673, which enables a slidably mounted storage container to be readily moved along the sidewalls of the pickup truck throughout the length of the bed. While the present invention is not intended to be limited to its use with the inventor's mounting fixture disclosed in his prior patent, the saddle box of the present invention may incorporate and be used with such a sliding structure. Accordingly, the disclosure of U.S. Pat. No. 6,116,673 is incorporated herein by reference.

Storage boxes of this type, commonly referred to as saddle boxes, are supported on the sidewalls of the pickup truck bed and extend downwardly into the bed space to provide a greater depth of storage within the open space defined by the pickup truck bed. Such boxes must be of a size sufficient to meet the storage demands of the user, while being strong enough to support heavy loads carried within while supported from the sidewalls of the pickup bed. In addition, protection of the items contained within the storage box requires that the storage box prevent water, snow, dirt and other environmental borne contaminants from entering the box interior.

Because such storage boxes are large, extending a length sufficient to overlie the pickup truck bed sidewalls from which the box is supported, and a maximum depth substantially equal to the depth of the pickup truck bed, shipping such storage boxes from the manufacture to wholesalers, distributors, retailers or an ultimate consumer has been very difficult and in many cases economically prohibitive. While shipments from a manufacturer to a distributor or wholesaler can be accomplished by the economies of scale by shipment of a large number of units to a single particular location, the costs of such shipments of large quantities of storage boxes can be further reduced by the present invention. For example, in international and trans continental shipment pre-sized containers are used, into which product is loaded for shipment. The present invention significantly increases the number of storage boxes which may be shipped in such containers and, thereby, decreases the per unit cost of shipment. In addition, shipments of small orders to a retail establishment or a single unit to a particular consumer are not economically feasible. Accordingly, direct sale from the manufacturer to a consumer, and the attendant cost savings to the consumer, have not heretofore been possible because such boxes do not meet the size requirements of the major parcel shipping services such as United Parcel Service. Saddle boxes are considered freight and consequently must be shipped by motor freight at a significant additional cost in addition to the price of the saddle box storage container.

The present invention is intended to overcome the problems associated with the cost of shipping such storage containers from the manufacturer, and permits saddle box storage containers to be shipped by the major parcel shipping services.

BRIEF DESCRIPTION OF THE DRAWINGS

Features of the invention, together with additional advantages contributing thereto and accruing therefrom, will be apparent from the following description of a preferred embodiment of the invention which is shown in the accompanying drawings with like reference numerals indicating corresponding parts throughout, wherein.

DETAILED DESCRIPTION OF A PREFERRED EMBODIMENT

Figure 1:
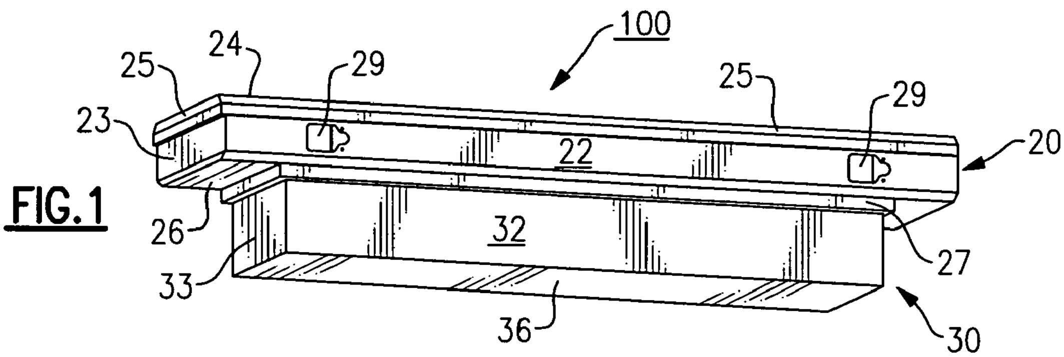
FIG. 1 is a perspective view of a saddle box storage container of the present invention in an erected condition prior to being collapsed for shipping or erected from a collapsed position after receipt at the shipping destination.
Figure 2:
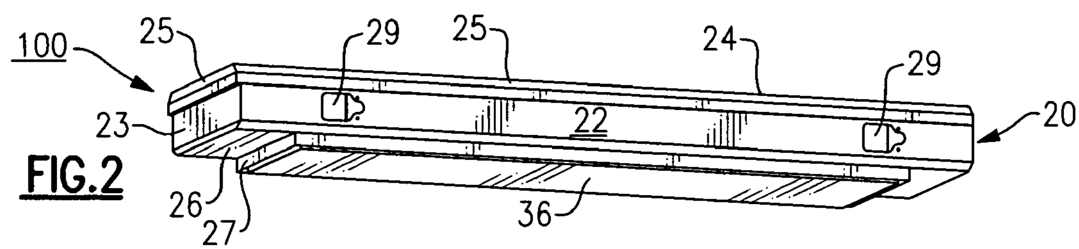
FIG. 2 is a perspective view of the saddle box of FIG. 1 in a collapsed condition ready for shipment or as received after shipment to the point of destination.

Referring now to FIG. 1, there is illustrated a collapsible saddle box 100 comprising an upper portion 20 and a lower portion 30. The upper portion 20 comprises a pair of sidewalls 22 extending parallel to each other and of a length sufficient to extend the width between the sidewalls of a pickup truck from which the saddle box 100 is suspended. Preferably, the sidewalls 22 will extend a distance beyond the interior width of the pickup truck bed to enable the saddle box to be supported there between to be used with "narrow" or "wide" bed pickup trucks. A pair of spaced parallel end walls 23 define the width of the saddle box and form a perimeter for the upper portion 20. A top 24, having beveled edges 25, is used to cover the open top of the upper portion 20 and may be pivotally connected to the top of one of the sidewalls 22, if desired. A suitable seal (not illustrated) is formed between the top 24 and the top of the upper portion 20, to prevent entry of environmental contaminants such as rain or snow or dust, into the saddle box interior.

Figure 3:
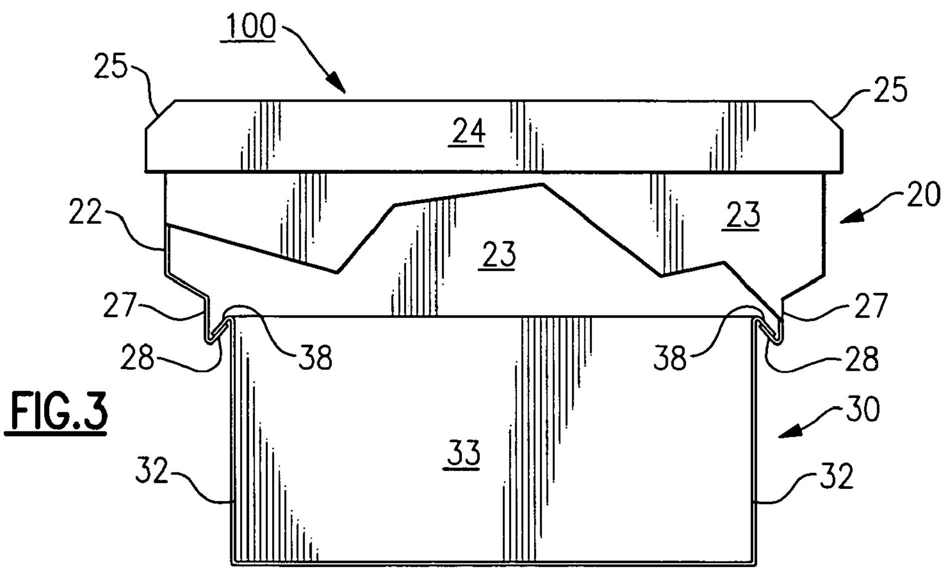
FIG. 3 is an enlarged end view of the saddle box illustrated in FIG. 1 with portions broken away to better illustrate the manner in which the saddle box appears prior to being collapsed for shipment or after being erected at the point of destination.
Figure 4:
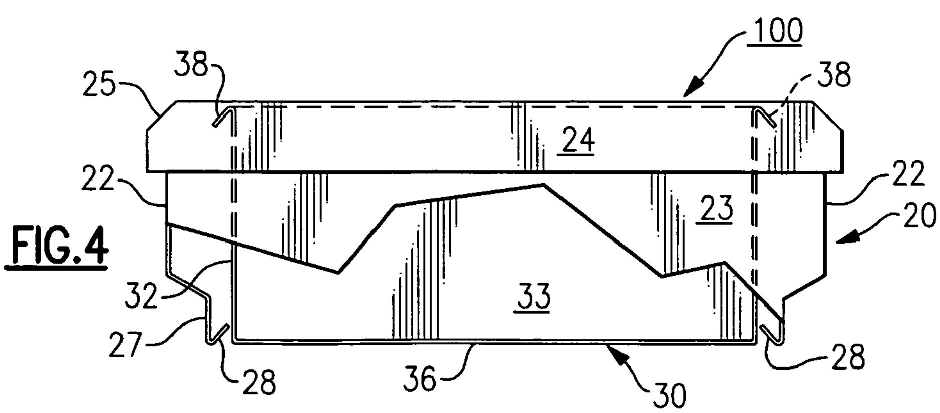
FIG. 4 is an enlarged end view of the saddle box as illustrated in FIG. 2 with portions broken away to better illustrate the manner in which the saddle box is collapsed to comply with shipping requirements.

A bottom 26 of the upper portion 20 includes a frame 27, and closes the interior of the upper portion 20 except for an opening formed therein through which the lower portion 30 of the saddle box may be collapsed into the interior of the upper portion 20 to facilitate shipping. To this end, the frame 27 of the upper portion 20 of the saddle box, best illustrated in FIGS. 3 and 4, is formed with an inwardly turned lip 28 which extends along each one of the four sides which form the frame 27. The lip 28 extends both inwardly and upwardly towards the interior of the upper portion 20 to form one part of a complementary-shaped support by which the lower portion 30 is suspended from the upper portion 20 when the lower portion 30 is moved outwardly from the interior of the upper portion 20 when the saddle box is erected after shipment. A pair of releasable locks 29 are carried by the upper portion 20 to releasably secure the top 24 closed to maintain the integrity of the interior and contents of the saddle box 100.

The lower portion 30 of the collapsible saddle box 100 comprises a pair of sidewalls 32 extending parallel to each other and of a length sufficient to fit between the sidewalls of a pickup truck. When the collapsible saddle box 100 is intended for use with a slide system such as disclosed in the inventor's U.S. Pat. No. 6,116,673, the width and depth of the lower portion 30 is sized to fit between or over the rear wheel coverings as illustrated in the referenced patent. A pair of spaced parallel end walls 33 define the width of the saddle box 100 and in combination with the sidewalls 32 form a perimeter for the lower portion 30. A bottom wall 36 closes the bottom of the lower portion 30. The top of the lower portion 30 is formed by upper edges of the sidewalls 32 and end walls 33, and is open. The upper edge perimeter of the lower portion 30 includes an outwardly turned lip 38 which extends along each one of the four sides of the lower portion 30 and is turned both outwardly and downwardly to form a second part of a complimentary-shaped support by which the lower portion 30 is suspended from the upper portion 20 when the lower portion 30 is moved outwardly from the interior of the upper portion 20 such as when the saddle box 100 is erected after shipment. The length of the sidewalls 32 and width of the end walls 33 are sized to permit the lower portion 30 to be telescoped into the interior of the upper portion 20 for shipment, and to cause the two complimentary-shaped lip portions 28 and 38 to engage when the saddle box 100 is erected.

Figure 5:
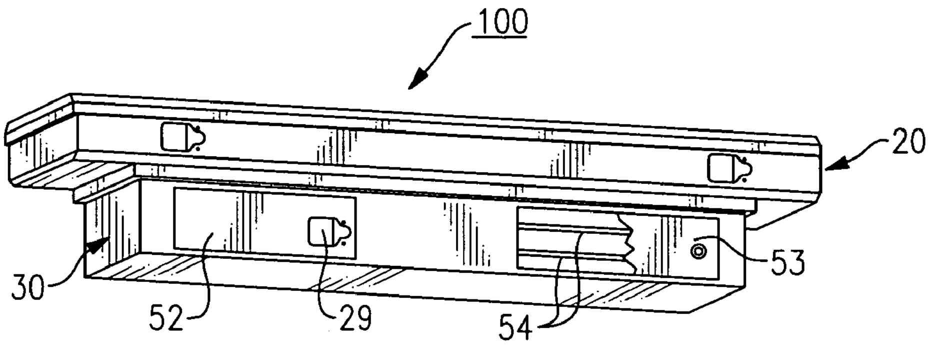
FIG. 5 is a perspective view of an embodiment of the invention having cabinet style doors and shelves.
Figure 6:
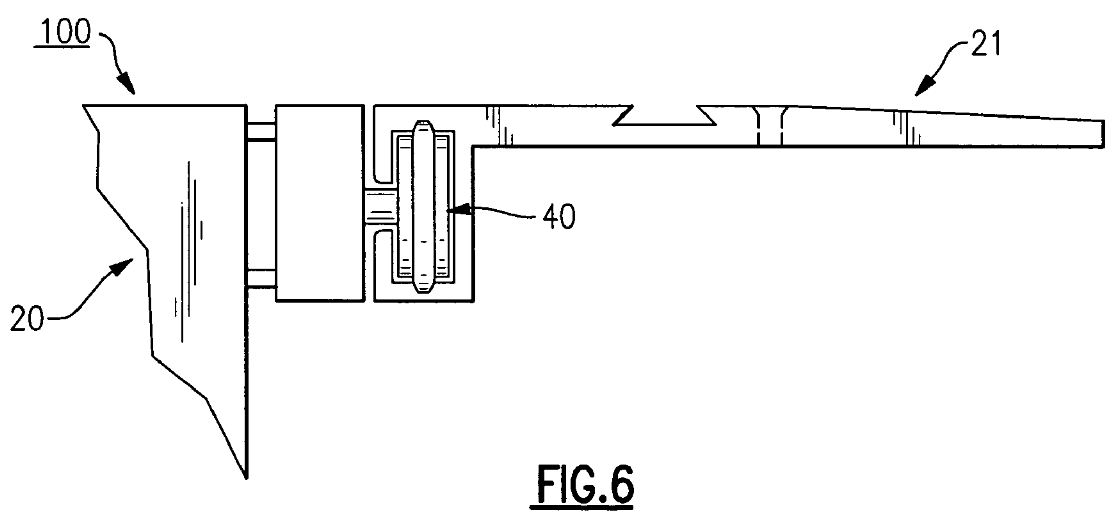
FIG. 6 is a planar view of a portion of a carriage/roller unit and slide system for use with the invention.

While the embodiment of the saddle box 100 illustrated in FIGS. 1–4 does not utilize cabinet-style doors, in the alternative embodiment illustrated in FIG. 5, the lower portion 30 of the saddle box 100 includes a cabinet-style door 52 formed in the face of one of the sidewalls 32 of the lower portion 30. The cabinet-style door 52 can be of the hinged type as illustrated, or a sliding type as illustrated, by reference numeral 53. In addition, the interior of the lower portion 30 may include shelves 54, depending upon the purpose for which the saddle box 100 is to be used. As illustrated in FIG. 6, a carriage/roller unit 40 can be secured to the collapsible saddle box 100 to enable the saddle box to be utilized in a slide system 21 such as that of the inventor's prior U.S. Pat. No. 6,116,673.

While this invention has been described in the specification and illustrated in the drawings with reference to preferred embodiments, the structures of which have been disclosed herein, it will be understood by those skilled in the art to which this invention pertains that various changes may be made and equivalents may be substituted for elements of the invention without departing from the scope of the claims. Therefore, it is intended that the invention not be limited to the particular embodiments disclosed in the specification and shown in the drawings as the best modes presently known by the inventors for carrying out this invention nor confined to the details set forth, but that the invention will include all embodiments modifications and changes as may come within the scope of the following claims:

What is claimed is:

1. A collapsible saddle box adapted to be erected and suspended from spaced apart truck sidewalls above a bed of a pickup truck, said collapsible saddle box comprising:

an upper housing extending a length sufficient to bridge the space between the spaced apart sidewalls of a pickup truck, said upper housing having a bottom wall for support upon said sidewalls above the pickup truck bed;

a lower housing adapted to extend through said bottom wall of said upper housing into said bed and be supported in said bottom wall of said upper housing when in a first extended position relative to said upper housing, said lower housing containing a bottom wall for closing said lower housing; and said lower housing adapted to telescope into said upper housing through the bottom wall of said upper housing to bring said bottom walls of the two housing into substantially a coplanar relationship when in a second collapsed position.

2. The collapsible saddle box of claim 1 further including means for retaining said lower housing in said first extended position relative to said upper housing.

3. The collapsible saddle box of claim 1 further including a frame carried in said bottom wall of said upper housing; and said frame including upper housing retaining means for retaining said lower housing in said first extended position relative to said upper housing.

4. The collapsible saddle box of claim 3 wherein said lower housing includes lower housing retaining means for engaging said upper housing retaining means for retaining said lower housing in said first extended position relative to said upper housing.

5. The collapsible saddle box of claim 3 wherein said upper housing retaining means comprises a flange extending from at least a portion of said frame.

6. The collapsible saddle box of claim 5 wherein said flange is turned inwardly toward the interior of said upper housing.

7. The collapsible saddle box of claim 6 wherein said flange extends about the periphery of said frame.

8. The collapsible saddle box of claim 4 wherein said lower housing retaining means comprises a flange extending outwardly from an open top of said lower housing into an interfering relationship with said upper housing retaining means when said lower housing is in said first extended position.

9. The collapsible saddle box of claim 8 wherein said upper housing retaining means and said lower housing retaining means are formed in complementary engaging shapes.

10. The collapsible saddle box of claim 2 wherein said means for retaining said lower housing in said first extended position prevents said lower housing from being completely withdrawn outwardly from said upper housing when in said first extended position.

11. The collapsible saddle box of claim 1 further including a removable top for closing said upper housing.

12. The collapsible saddle box of claim 11 further including lock means for selectively securing said top to said upper housing.

13. The collapsible saddle box of claim 1 wherein said lower housing includes at least one access door formed therein to facilitate access to the interior thereof.

14. The collapsible saddle box of claim 1 wherein said upper housing includes a carriage with rollers for mounting said collapsible saddle box in a guideway for movement along the sidewalls of the pickup truck.

15. The collapsible saddle box of claim 14 further including guideway forming means adapted to receive said rollers for movement of said upper housing along the sidewalls of the pickup truck.

16. The collapsible saddle box of claim 15 wherein said guideway means comprises:

an L-shaped bracket adapted to be secured to one of a pair of the spaced sidewalls which defines in part the bed of the pickup truck;

said L-shaped bracket having a first horizontally extending leg adapted to be secured to one of the pair of spaced sidewalls in a plane parallel to the bed of a pickup truck;

said L-shaped bracket having a second vertically extending leg depending from said first horizontally extending leg in a downward direction into the bed of the pickup truck; and said second vertically extending leg having an opening formed therein for receiving said rollers for freely sliding said collapsible saddle box along said guideway.

17. The collapsible saddle box of claim 16 wherein said second vertically extending leg converges inwardly toward an opposed sidewall which defines in part the bed of the pickup truck at an angle of convergence equal to an angle of divergence between the opposed sidewalls.

18. The collapsible saddle box of claim 1 wherein a width of said upper housing relative to the length of the pickup truck bed is less than the length of the pickup truck bed so that both the pickup truck bed and the saddle box can be used simultaneously for storing materials.

* * * * *